July 27, 1948. H. R. LUPER 2,445,959
TIRE PRESSURE SWITCH
Filed Aug. 18, 1945 2 Sheets—Sheet 1.
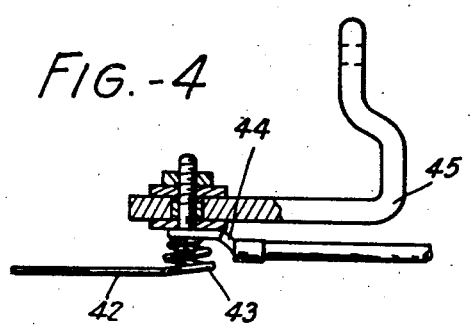
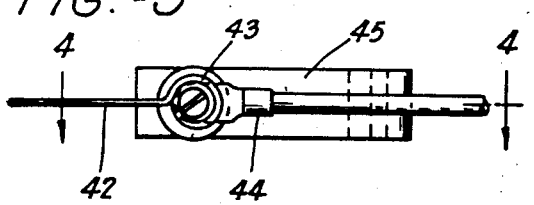
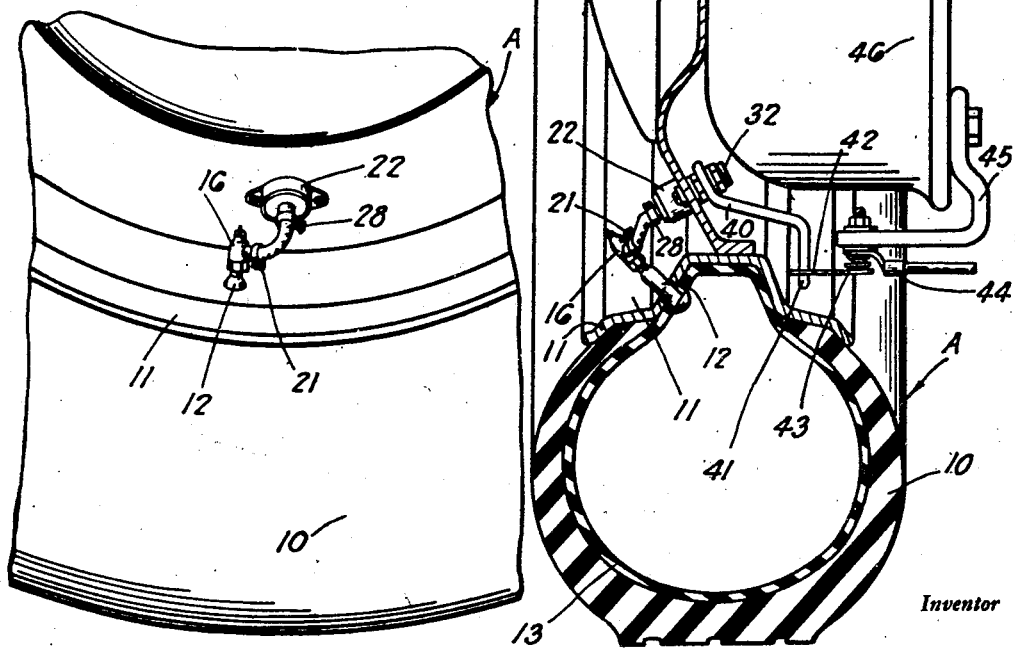
Inventor
HARVEY R. LUPER July 27, 1948. H. R. LUPER 2,445,959
TIRE PRESSURE SWITCH
Filed Aug. 18, 1945 2 Sheets—Sheet 2
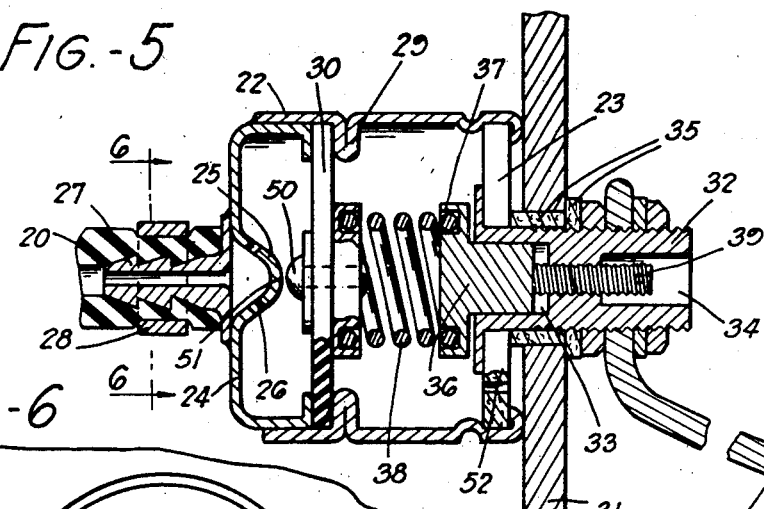
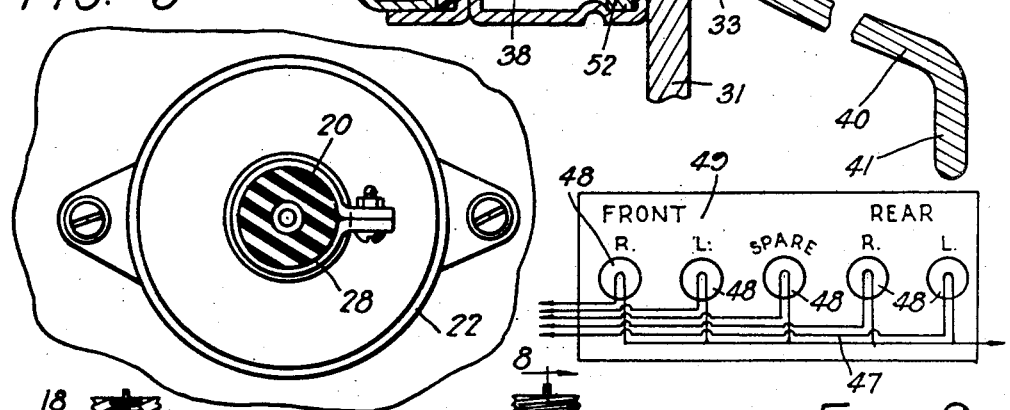
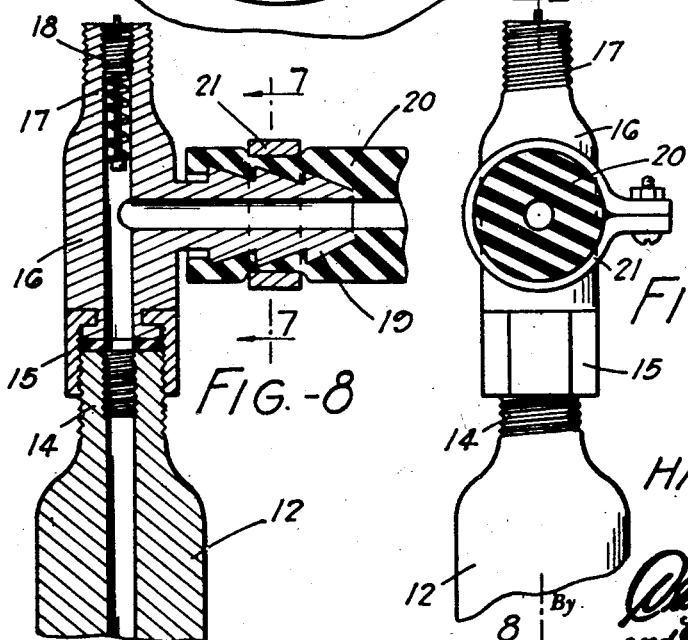
Inventor
HARVEY R. LUPER
By Clarence A. O'Brien
and Harvey B. Jacobson
Attorneys Patented July 27, 1948

2,445,959

UNITED STATES PATENT OFFICE 2,445,959

TIRE PRESSURE SWITCH

Harvey R. Luper, Portsmouth, Va.

Application August 18, 1945, Serial No. 611,285

1 Claim. (Cl. 200—58)

The invention relates to an air pressure signalling device, and more especially to a pneumatic tire air pressure signalling system for equipment on motor vehicles.

The primary object of the invention is the provision of a device or system of this character, wherein a signal control circuit for each pneumatic tire of a motor vehicle is effective for signalling the condition of such tire as to the air pressure at a predetermined stage so that the operator of the motor vehicle will have knowledge of such condition, especially when the air pressure is low and at a danger point that would cause damage to the tire and its innertube and thereby rectify such conditions.

Another object of the invention is the provision of a device or system of this character, wherein the signalling set-up thereof is adapted to be in full view of the operator of the motor vehicle so that he can determine at a glance just which tire has become deflated to a dangerous point and the system or device involves a signalling set-up for the four motor vehicle tires and the spare tire as carried thereby, the device or system being adapted to put the driver or the user of the motor vehicle on notice that a tire or tires thereof have arrived at a dangerous condition, resulting in overheating, which may result in the breaking of the cords of the casing, the melting of the innertube or wear or cut at the rim causing blowouts, punctures or the breaking down of the side walls of the casing.

A further object of the invention is the provision of a device or system of this character, wherein the same may be utilized with double pneumatic tires or with the single tire on the respective wheels of a motor vehicle, as well as the spare tire or tires carried thereby to signal deflated periods or conditions that may arise from time to time, so that correction can be made thereto without liability of subsequent damage to the tire or tires through neglected use thereof.

A still further object of the invention is the provision of a device or system of this character, which is extremely simple in construction, thoroughly reliable and efficient in operation, durable, possessed of few parts, thus being economical in repairs and replacement, strong, positive in the working thereof and inexpensive to manufacture and install.

With these and other objects in view, the invention consists in the features of construction, combination and arrangement of parts, as will be hereinafter more fully described, illustrated in the accompanying drawings, which disclose a preferred embodiment of the invention and pointed out in the claim hereunto appended.

In the accompanying drawings:

Figure 1 is a fragmentary elevation, partly in section, of a motor vehicle wheel having a pneumatic tire mounted thereon with the signalling device or system constructed in accordance with the invention applied thereto.

Figure 2 is a fragmentary side elevation.

Figure 3 is a plan view of those parts and looking toward the same of the device or system as shown in Figure 4.

Figure 4 is a sectional view taken on the line 4—4 of Figure 3 looking in the direction of the arrows.

Figure 5 is an enlarged longitudinal section taken through substantially the center of the circuit closer of the device or system.

Figure 6 is a sectional view taken approximately on the line 6—6 of Figure 5 looking in the direction of the arrows.

Figure 7 is a sectional view taken approximately on the line 7—7 of Figure 8 looking in the direction of the arrows.

Figure 8 is a sectional view taken approximately on the line 8—8 of Figure 7 looking in the direction of the arrows.

Figure 9 is a diagrammatic view of the electric circuit of the device or system and showing the signalling panel and signal for the respective pneumatic tires of a motor vehicle including the spare thereof.

Similar reference characters indicate corresponding parts throughout the several views in the drawings.

Referring to the drawings in detail, A designates generally a portion of a motor vehicle wheel which is shod with a pneumatic tire 10 at its rim 11 in the usual well known manner that is supplied with air through an inflating stem 12 to the inner tube 13 within the casing of such tire.

Detachably connected to the externally threaded reduced outer end 14 of the stem 12 by a coupling nut 15 is a substantially T-shaped three-way capping nipple 16 which, in the outer externally threaded reduced end 17, has accommodated therein the air return check valve 18, which has been removed from the stem 12 in its usual fitting therewith. The end 17 is adapted for connection with the usual air inflation hose, not shown, for the inflation of the pneumatic tire in the ordinary well known manner.

The capping nipple 16 at its branch 19 has coupling with a short length of flexible rubber hose 20, the coupling being had by a hose clamping collar 21 embracing it about the branch 19, as best seen in Figures 7 and 8 of the drawings. This hose 20 has coupling with a circuit closer, comprising a substantially cup-shaped or cylindrical body 22 which at one end carries an insulating block 23 providing a head at such end, while the other end outermost to the head 23 has removably telescoped therein a cover 24 which constitutes the head at this end, the cover 24 at the center thereof is provided with an instruck perforated nozzle 25, its perforation 26 being communicated with a nipple 27 engaged by the hose 20 and held secure by a hose clamp 28, so that air under pressure can be transferred from the stem 12 through the hose 20 to the interior of the body 22.

The cover 24 which is made fast to the body 22 in any suitable manner holds secure in place upon a seating shoulder 29 interiorly of the said body 22 a flexible diaphragm 30 which confronts the nozzle 25 to be affected by the impact of air under pressure therefrom. The body 22 at the head 23 is detachably secured in place at the outer side of the disk center area 31 of the wheel close to the rim 11 by a bolt-like member 32, which has the inner and outer axial aligned sockets 33 and 34, respectively. The member 32 in its fitting with the area 31 has insulation protection 35 therefrom. Displaceably fitting the socket 33 in the member 32 is an electric circuit closing assembly 36 having interposed between the diaphragm 30 and this assembly 36 and counterseated at 37 is a cushioned spring 38 of the coiled type. The socket 34 in the member 32 has adjustably concealed therein a pressure set screw 39, it being accessible through the open outer end of the socket 34 for manual adjustment as will be best seen in Figure 5 of the drawings.

The member 32 has secured thereon an electric terminal connector lead 40 which is rigid and its end 41 is arranged in the path of a resilient striker 42 having the springy coil connection 43 with an electric terminal 44 fixed to a bracket 45 secured to the stationary portion of a brake drum 46 and such terminal 41 brushes the part 42 on the completion of each revolution of the wheel to effect an opening and closing switch arranged within an electric circuit 47 individual to each pneumatic tire of the motor vehicle, not shown. Each circuit 47 has therein an electric light 48. This light 48 is supported upon a panel 49 interiorly of the body of the motor vehicle. In this instance there is a group of five lights 48, one being captioned by the letter "R," another the letter "L," another the word "Spare," another the letter "R," and the remaining one the letter "L." Those lights 48 grouped as "R" and "L," there being two groups, one at one side of the word "Spare" and the other at the other side thereof on the panel 49, are identified by the words "front" and "rear," so that a person can readily identify the particular tire, either at the right or left and front or rear of the motor vehicle in the working of the signalling system or device.

The electric circuits 47 to the respective lights 48 receive electrical energy from the wiring system as installed for electrical service within the motor vehicle.

The nozzle 25 constitutes an electric contact for cooperation with a movable contact 50 confronting the same and supported centrally on the diaphragm 30 next thereto. When the diaphragm 30 has been affected by the lowering of the pressure within the determined tire on the motor vehicle the contact 50 will engage a contact 51 companion thereto as created by the nozzle 25 so that the circuit 47 to that particular tire becomes closed and the light 48 arranged in such circuit will illuminate, thus signalling an observer of the condition of the air pressure at the low stage within such tire or a correction thereto.

It should be apparent that the set screw 39 when manually adapted, regulates the action of the diaphragm 30 within the body 22 so as to determine the inflation of the pneumatic tire to a definite pounds pressure. The head 23 is provided with an escape vent 52 so as to avoid the trapping of air withing said body.

As regard to the spare pneumatic tire carried by the motor vehicle, the device or system under adjustment has the terminal 41 engaged with the part 42 at all times so that the electric circuit to this particular spare tire will become closed when the contacts 50 and 51 engage with each other on deflation of the tire to a determined point and thus the signalling of this fact can be had for that particular tire.

What is claimed is:

A pressure controlled switch for a tire deflation signal comprising a tubular casing, an inwardly extending annular shoulder near one end of the casing, a disk of non-conducting material fixed in the end of the casing remote from the shoulder, an externally screw-threaded mounting stud extending axially through the disk, a clamp nut threaded on the stud for holding the switch on a support, said stud having an axial socket opening through one end and into the casing, a spring seat mounted in the socket for movement axially thereof, a diaphragm of flexible non-conducting material seated against the shoulder, a cover secured in said casing remote from the disk and bearing on the diaphragm to form in conjunction therewith a pressure chamber, means in the cover for admitting fluid under pressure to the chamber, an electrical contact carried by the diaphragm and extending axially therethrough, and a compression spring bearing against the spring seat and bearing on the diaphragm to urge the contact into engagement with the cover when fluid pressure in the pressure chamber falls below a predetermined value.

HARVEY R. LUPER.

REFERENCES CITED

The following references are of record in the file of this patent:

UNITED STATES PATENTS

| Number | Name | Date |
|---|---|---|
| 984,453 | Terpening | Feb. 14, 1911 |
| 1,144,834 | Freeman | June 29, 1915 |
| 1,956,578 | Johnston | May 1, 1934 |
| 2,037,016 | Fator | Apr. 14, 1936 |
| 2,127,187 | Riusech | Aug. 16, 1938 |
| 2,188,112 | Hicks | Jan. 23, 1940 |
| 2,199,032 | Stoddard | Apr. 30, 1940 |
| 2,206,158 | Budd | July 2, 1940 |
| 2,239,676 | Henry | Apr. 29, 1941 |
| 2,316,461 | Schubert | Apr. 13, 1943 |
| 2,331,571 | Risser | Oct. 12, 1943 |
| 2,347,541 | Crister et al. | Apr. 25, 1944 |